July 19, 1938. W. W. LASKER 2,124,176
SUB AND GRAND TOTAL MECHANISM
Filed Dec. 18, 1923 7 Sheets-Sheet 1

INVENTOR
William W Lasker
BY Cruse Ahmann
his ATTORNEYS

July 19, 1938.  W. W. LASKER  2,124,176
SUB AND GRAND TOTAL MECHANISM
Filed Dec. 18, 1923   7 Sheets-Sheet 3

INVENTOR
William W. Lasker
BY Cruse & Hanna
his ATTORNEYS

July 19, 1938.  W. W. LASKER  2,124,176
SUB AND GRAND TOTAL MECHANISM
Filed Dec. 18, 1923    7 Sheets-Sheet 5

INVENTOR
William W Lasker
BY Cruse Shaun
his ATTORNEYS

July 19, 1938.  W. W. LASKER  2,124,176
SUB AND GRAND TOTAL MECHANISM
Filed Dec. 18, 1923   7 Sheets-Sheet 6

INVENTOR
William W Lasker
BY Cruse Shumann
his ATTORNEYS

Patented July 19, 1938

2,124,176

UNITED STATES PATENT OFFICE 2,124,176

SUB AND GRAND TOTAL MECHANISM

William W. Lasker, Brooklyn, N. Y., assignor, by mesne assignments, to Remington Rand Inc., New York, N. Y., a corporation of Delaware Application December 18, 1923, Serial No. 681,333

8 Claims. (Cl. 235—61.6)

This invention relates to accounting machines, and particularly to the total-taking mechanism thereof. According to the present invention, I provide an accounting machine having two independent sets of accumulating wheels, both of which act simultaneously to accumulate items, but neither of which is affected when a total accumulated by the other set is being printed. By such an arrangement, I may, for example, use one set of accumulating wheels to print sub-totals and the other set to print grand totals; or, if desired, I may use one set to print sub-totals and the other set to print sub-sub-totals.

For the purposes of illustration, the accompanying drawings show my invention applied to a tabulating machine of the type described in Powers Patent No. 1,245,502, issued on November 6, 1917, and including some of the modifications described in Powers Patent No. 1,236,481, issued on August 14, 1917, and No. 1,376,555, issued on May 3, 1921.

In these drawings.

Figure 1:
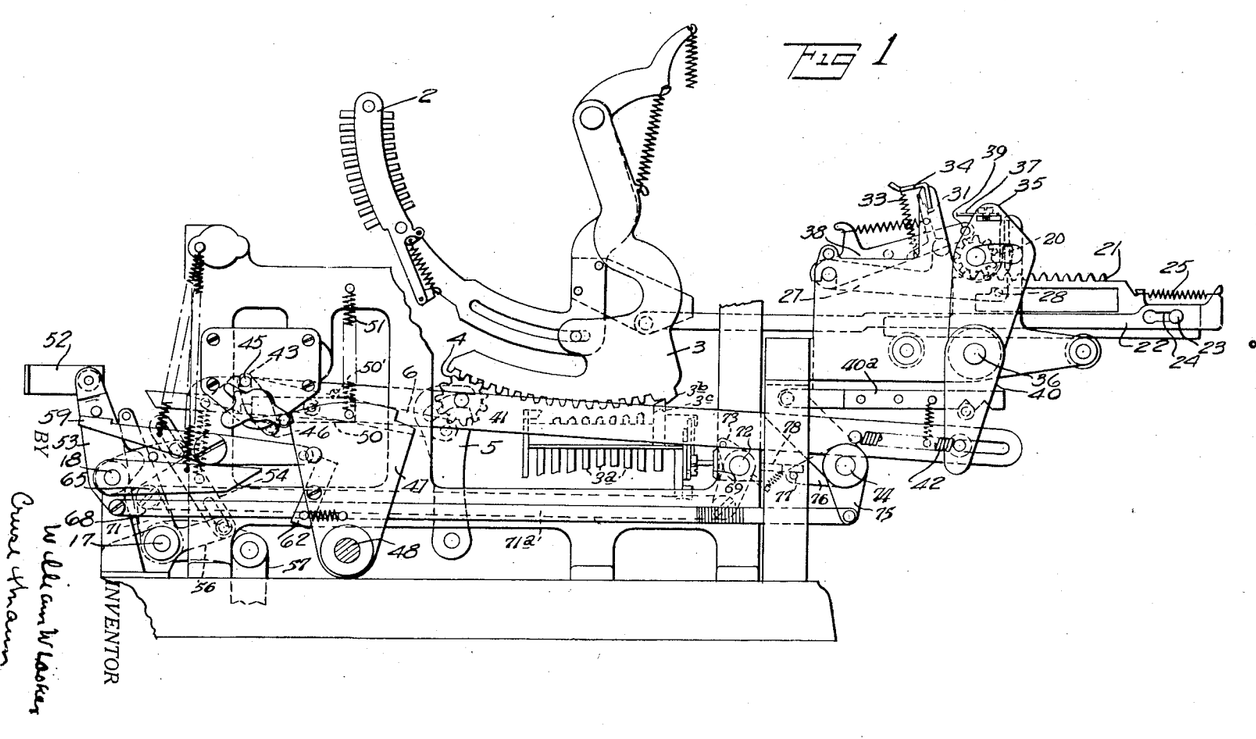
Fig. 1 shows a portion of a machine embodying my invention, with certain parts not having to do with the present invention removed.
Figures 1A, 15:
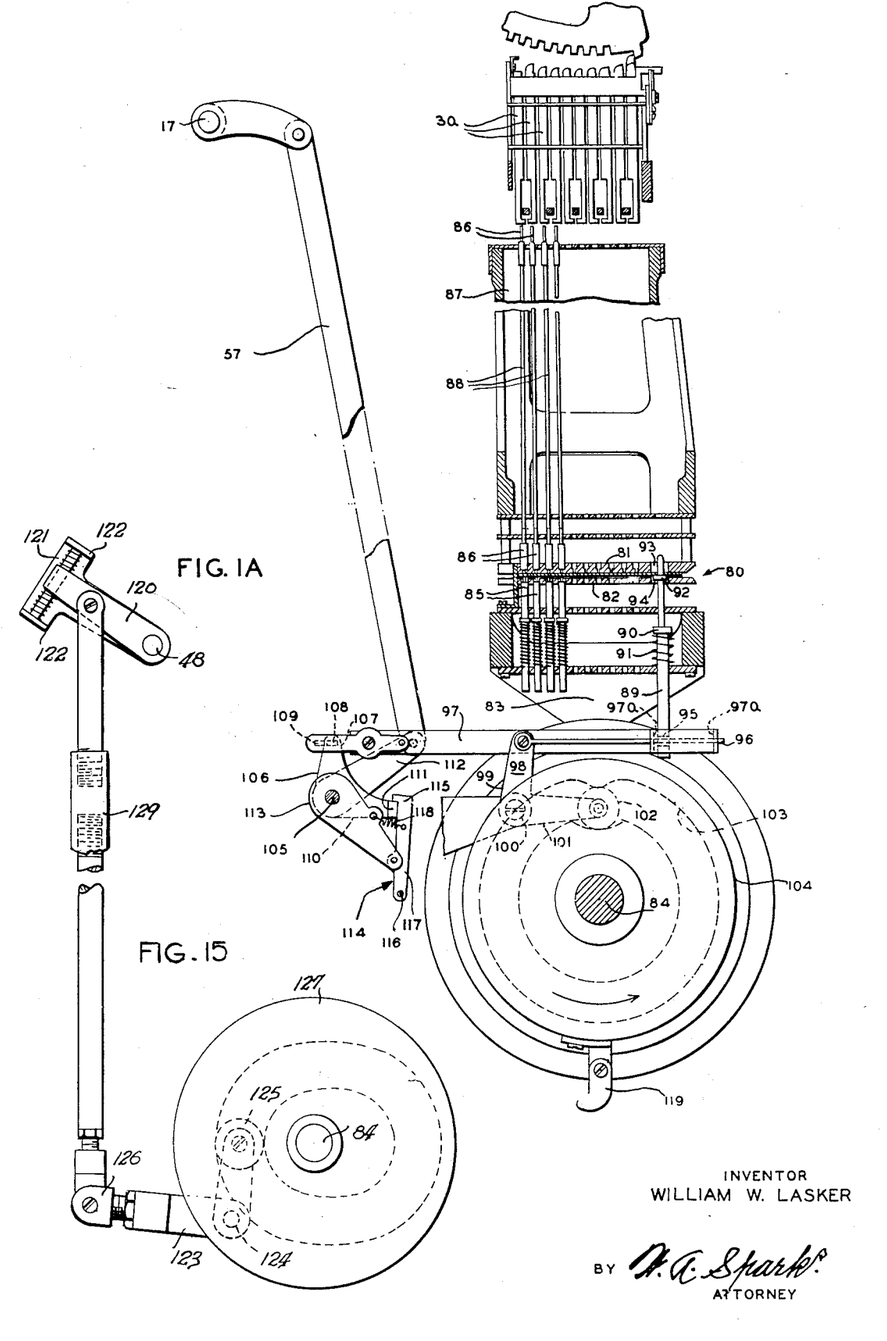
Fig. 1A shows the card-operated total latch for conditioning one set of accumulating wheels for total-taking.
Fig. 15 shows the mechanism for rocking the main shaft in the head of the machine.

Referring to Fig. 1A, the machine is provided with the usual card magazine (not shown) which holds the cards to be tabulated and with card feeding means (not shown) for feeding the cards one at a time from the magazine to the sensing chamber 80 which is formed by an upper plate 81 and a lower plate 82 spaced from the upper plate. Disposed below the lower plate 82 is a pin box 83 which is adapted to be vertically reciprocated by suitable actuating means mounted on the main drive shaft 84. The pin box carries a column of sensing pins 85 for each of the columns on a record card. Disposed above the upper plate 81 of the sensing chamber are columns of interponents 86, there being as many of these columns as there are columns of sensing pins, and the interponents in each column being aligned with the sensing pins in the corresponding column. The head of the machine is provided with a plurality of accumulating units, each of which is controlled by a plurality of columns of stops 3a. Each column of stops contains ten stops corresponding to the zero digit and to the digits from 1 through 9. Associated with each column of stops 3a is a toothed sector 3 (Fig. 1) and operatively associated with each sector is a type bar 2. A translator basket 87 is disposed between the interponents 86 and the stops 3a, and carried by the basket is a plurality of translating wires 88. Each column of interponents is associated with one of the columns of stops by means of the translating wires, each of which has its lower end in registry with an interponent 86 and its upper end in registry with a stop 3a. When fed into the sensing chamber, each card is arrested in sensing position by the usual card stops and after the card has been thus positioned, the pin box is raised, thereby causing the sensing pins to sense the perforations in the card. When a perforation representing a particular digit is sensed from a particular column on the card, the sensing pin that senses the perforation raises the corresponding interponent 86, which, in turn, actuates the corresponding translating wire 88 to lift the associated stop 3a. Each stop when raised is positioned in the path of a shoulder 3b on the associated toothed sector, with the result that the sector and associated type bar are arrested by the stop in a position to permit the sensed digit to be printed.

Each toothed sector is normally held in its retracted position by an associated zero shutter or zero stop plate, similar to the stop plate 38 shown in Powers Patent No. 1,236,481. A tooth 3c on each shutter normally engages a shoulder 3b on the associated toothed sector, thereby holding the sector retracted. Upon the elevation of any one of the stops 3a, except the zero stop, the zero shutter is tilted and the tooth 3c is removed from the path of the shoulder 3b on the corresponding toothed sector, thereby allowing the sector to be advanced until the shoulder strikes the raised stop.

Figures 13, 14:
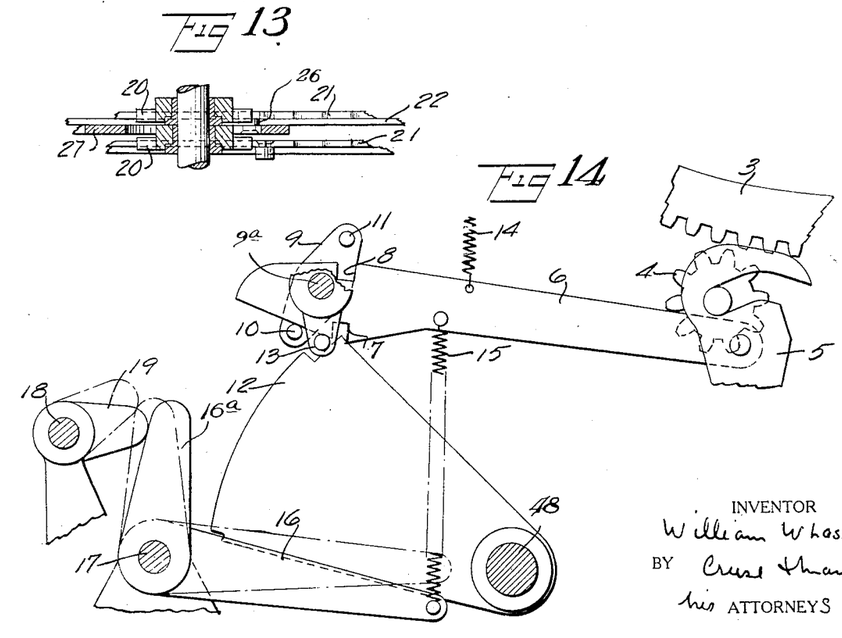
Fig. 13 is a detailed view of two of the accumulating wheels and their associated parts illustrating the transfer or carrying mechanism.
Fig. 14 is a diagrammatic view of the control of one of the accumulating wheels illustrating the connection between this control and the control mechanism shown in Fig. 2

The set of front accumulating wheels 4 is loosely mounted on a rod having its opposite ends supported in a slot in each of the two crank arms 5 (see Fig. 14). A bar 6 is provided for moving the accumulating wheels 4 out of and into engagement with the racks 3. This bar is pivoted to one of the crank arms 5 and is provided with two notches 7 and 8. Associated with the bar 6 is a crank 9 which is fixed to a rod 9a supported by arms on a casting (not shown). The crank 9 carries an upper pin 11 which is adapted to cooperate with notch 8 when bar 6 is in raised position, and a lower pin 10 which is adapted to cooperate with notch 7 when bar 6 is in its lower position. Crank 9 is rocked back and forth by the contact of cam sector 12 against a roller 13 attached to an arm fixed to the rod 9a. Bar 6 is normally held in raised position by a spring 14, but can be drawn down to its lower position by an arm 16 fixed to a main total shaft 17 and connected to the bar 6 by a spring 15. The cam sector 12 is fixed to shaft 48 which is rocked forward and backward during each cycle of the machine. It is rocked by the usual means employed in the Powers tabulator and may, for example, be rocked by mechanism disclosed in Powers Patent No. 1,245,502, previously referred to, and illustrated herein by Fig. 15. Referring to this figure, an arm 120 is loose on the shaft 48 and another arm 121 is fixed to this shaft. The free end of the arm 121 is provided with forks 122 and a rod which extends through an opening in the arm 120 is supported by the forks. Two compression springs are disposed on this rod and each spring has its opposite ends compressed between a fork and one edge of the arm 120, thereby providing a yielding connection between the arm 120 and the shaft 48. A bell-crank 123 is fulcrumed on a stud 124 fixed to the main frame of the machine, and has on one arm a roller 125 and on the other arm an adjustable head 126. The roller 125 cooperates with a slot cam 127 fixed to the main drive shaft 84 and the adjustable head 126 is connected to the arm 120 by a link 128 which may be adjusted in length by means of a turn buckle 129. It will be evident from this description that the cam 127 causes the shaft 48 to rock forward and backward during each cycle of the machine, thereby rocking the cam sector 12.

Under normal tabulating conditions, the accumulating wheels 4 are in engagement with the racks 3 at the beginning of each item recording cycle, as is shown in Fig. 1, the cam sector 12 is in its extreme rearward position and not in its extreme forward position as it is shown in Fig. 14 and bar 6 is raised and is in its extreme forward position and not in its extreme rearward position as it is shown in Fig. 14. When the bar 6 is raised and in its extreme forward position, the pin 11 rests in notch 8 of the bar. The sectors 3 and the type bar 2 are arranged to be reciprocated by the cam sector 12 and the type bars 2 and sectors 3 start their forward stroke shortly after the cam sector 12 starts its forward stroke and start their backward stroke shortly after the cam sector starts its backward stroke. At the beginning of the forward stroke of the cam sector 12, the roller 13 cooperates with the cam sector to rotate the crank 9 in a clockwise direction, whereupon the pin 11 moves the bar 6 into its extreme rearward position, as it is shown in Fig. 14, thereby throwing the accumulating wheels 4 out of mesh with the racks 3 before they start their forward stroke. The accumulating wheels 4 remain out of mesh with the racks 3 during their forward stroke. The forward stroke of each rack 3, as previously stated, is limited by a raised stop 3a in the associated column or by the tooth 3c of the associated zero shutter. As the stop raised in each column corresponds to the digit sensed from a column on a card, the extent of the forward stroke taken by each sector 3 is determined by the digit sensed from a particular column of a card. As each type bar 2 is positioned in accordance with the extent of the forward stroke of the associated sector 3, the forward stroke of the sectors brings types, representing the item sensed from the card, into printing position. At the end of the forward stroke of the cam sector 12, the item represented by the setting of the type bars 2 is printed in a manner disclosed in Powers Patent No. 1,245,502. After item printing has been effected, the cam sector 12 begins its backward stroke. At the beginning of the backward stroke of the cam sector, the roller 13 cooperates with the cam sector to rotate the crank 9 in a counter-clockwise direction, whereupon the pin 11 moves the bar 6 into its extreme forward position, thereby throwing the accumulating wheels 4 into mesh with the racks 3 before they start their backward stroke. During the remainder of the backward stroke of the cam sector 12, the accumulating wheels 4 remain in mesh with the racks 3, and the previously printed item is entered into the wheels.

Total taking from the accumulating wheels 4 in any accumulating unit is effected under the joint control of a space card and a total card. The space card serves, as is well known in the art, to align those racks 3 which have been positioned one tooth space behind the other racks 3 during the operation of effecting a tens carry to their associated accumulating wheels 4. This operation of aligning each rack 3 will be explained in more detail at a more convenient point in the description. The total card serves to rock the main total shaft 17. This shaft is rocked by a pull rod or total link 57 (see Figs. 1 and 5) connected to an arm 58 fixed to the shaft and mechanism controlled by a total card is provided for pulling the link 57 whenever a total is to be taken. This mechanism is similar to that shown in my U. S. Patent No. 1,376,555. Disposed in the pin box 83 is a total pin 89 which has a collar 90 disposed above the lower plate of the pin box, between which collar and the lower plate is positioned a spring 91, by means of which the total pin is biased upwardly. Near the upper end of the pin 89 there is provided a collar 92 of slightly less diameter than the openings 93 and 94 formed in the plates 81 and 82. The lower end of the pin 89 is provided with an elongated slot 95 through which the rod 96 extends. Associated with the total pin 89 is a reciprocating bar 97 which is bent in a U-shape about the pin 89 to form arms 97a in which the end of rod 96 is supported. The reciprocatory bar 97 is fulcrumed on the upwardly extending arm 98 of the bell-crank lever 99, to which the end of the rod 96 is also connected, and the bell-crank lever is loosely mounted on the stud 100 secured in a bracket fastened to the main frame of the machine. The bell-crank lever 99 also has a laterally extending arm 101, the free end of which is provided with a cam roller 102 to engage the cam groove 103 of the box cam 104 mounted on the main drive shaft 84.

A shaft 105 secured to the main frame is provided on which is loosely mounted the casting 106 which has an upwardly extending arm 107 provided with a lateral lug 108 thereon to cooperate with the lateral lug 109 formed on the rearwardly extending end of the reciprocating bar 97. The casting 106 also has a laterally extending arm 110 provided with an anchoring stop 111, and a link connecting arm 112, to the free end of which is pivotally connected the link 57. Fixed to the shaft 105 is the bearing bracket 113 extending laterally and downwardly therefrom, to the free end of which is pivotally connected the latching lever 114 having a latching hook portion 115 at its upper end and a pin 116 extending laterally from its downwardly extending arm 117. The hook portion 115 is resiliently strained toward the stop 111 of the casting 106 by means of the spring 118 connected between its upwardly extending portion and the bracket 113.

The periphery of the cam 104 is provided with a cut-out lug 119 for cooperating with the pin 116 of the latching lever 114.

The operation of the arrangement is substantially as follows: The cards to be analyzed for taking a record have no perforations in alignment with the openings 93 and 94. Stop cards are provided with perforations in alignment with the openings 93 and 94, and of sufficient size to permit the passage therethrough of the collar 92 and total-taking cards are provided with perforations just sufficiently large to permit passage therethrough of the upper end of the pin 89 but to obstruct the upward passage of the collar 92. By this arrangement, whenever a record card is passed through the machine, the pin 89 will be obstructed in its upward movement by its upper end coming into contact with the card itself and thereby the stop 108, relative to the stop 109, will be so positioned that upon the actuation of the reciprocating bar 97, by the operation of the bell-crank lever 99, the casting 106 will not be actuated and consequently the main total-taking shaft 17 will be unaffected in its operation. On the other hand, when a stop card passes through the machine, or the card supply is exhausted and no card is disposed between the plates 81 and 82, the free passage of the collar 92 through the openings 93 and 94 will position the lug 108 below the lug 109, and again, upon the actuation of the bell-crank lever 99, the casting 106 will remain idle.

However, when a total card is passed through the machine and the upward movement of the total pin 89 is obstructed by its collar 92 coming into contact with the total card, the lug 108 will be disposed in the path of movement of the lug 109 so that, upon the actuation of the reciprocating bar 97 by the bell-crank lever 99, the casting 106 will be rocked, thereby rocking its lower arm so that its stop 111 will be latched by the portion 115 and, furthermore, rocking the main total shaft 17 by the connection of the lever 112 to the link 57. The co-action of the latch 115 with the stop 111 will anchor the main total shaft 17 in total-taking position until the lug 119 strikes the pin 116, thereby releasing the hook portion 115 from the stop 111, and permitting the main total shaft 17 to be returned to initial position by the springs 14. The return of the shaft 17 will also restore the casting 106 to idle position.

When the main total shaft is rocked, the arm 16 is rocked into the position shown in full lines in Fig. 14, thereby tensioning the spring 15 and drawing the bar 6 into its lower position. At the beginning of a cycle, as previously stated, the bar 6 is in its extreme forward position and the pin 11 is positioned in the notch 8 of the bar 6 and the pin 10 is behind the notch 7 in the bar. Hence, when the bar 6 is moved into its lower position at the beginning of a total cycle, the pin 10 does not enter the notch 7 until the end of the forward stroke of the cam sector 12 with the result that the bar 6 is held in its extreme forward position during the forward stroke of the cam sector 12, thereby conditioning the accumulating wheels 4 to remain in engagement with the racks 3 during their forward stroke. During the total cycle, the total card, being blank except for the total hole, prevents the sensing pins 85 from raising any of the stops 3a. By reference to Powers Patent No. 1,245,502, it will be understood that, when the accumulating wheels 4 remain in engagement with the associated racks 3 during their forward stroke and none of the stops 3a are raised, the forward stroke of the racks is limited by the amount standing in the accumulating wheels, and, accordingly a total is taken from them during the forward stroke of the racks. Upon the start of the backward stroke of the cam sector 12, the bar 6 is moved to its extreme rearward position, which is the position shown in Fig. 14, and the accumulating wheels 4 are held disengaged from the racks 3 during the backward stroke of the cam sector. It is thus evident that the following operations occur whenever a total cycle is initiated by the rocking of the main total shaft 17. The sectors 3 take a forward stroke under control of the accumulating wheels 4 until the type bars 2 are positioned to print a total of the amounts entered into the accumulators, and the accumulators are cleared at the end of the forward stroke of the racks, and at the end of the forward stroke of cam sectors 12 the total is printed. The sectors 3 then take a backward stroke until the type bars are restored to their original position, but the accumulators remain out of engagement with the sectors during their backward stroke so that the accumulators are retained in their cleared condition.

As previously stated, the casting 106, after being rocked, is automatically latched in this position by total latch 114 which retains it in this position for approximately the entire duration of the total cycle. As a result, the total link 57 is held down for the same period and the main total shaft 17 accordingly holds the bar 6 in its lower position long enough to permit the above described total-taking operation from the accumulating wheels 4. When the total link 57 is released, the bar 6 is restored to its raised position. As the bar 6 is in its extreme rearward position at the time it is raised, the pin 11 does not cooperate with the notch 8 on the first half of the next accumulating cycle and the bar is left in the position mentioned during that half cycle. The accumulating wheels 4 thus remain disengaged from the racks 3 during this half cycle, as they normally are during the first half of an accumulating cycle. At the end of the first half cycle, however, the pin 11 enters the notch 8, and the bar 6 is conditioned to move the accumulating wheels 4 into engagement with the racks 3 during the second half cycle. It is, therefore, evident that the raising of the bar 6 at the end of the total cycle, conditions it to effect ordinary accumulating operations on the accumulating wheels 4.

It is necessary to move the zero shutters from the path of the sectors 3 before a total may be taken from the accumulating wheels 4. Accordingly, at the farther side of the machine there is provided an arm 71, fixed to the main total shaft 17 (see Fig. 1), which corresponds to the arm 83 shown in Fig. 1 of the Powers Patent No. 1,236,481. When the main total shaft is rocked, the arm 71, through a rod 71a, rocks another shaft 72 (see Figs. 1 and 2) which corresponds to the shaft 59 in the patent referred to. Loosely mounted on the shaft 72 is cam 69 (see Figs. 1–3, inclusive). This cam is similar in construction and operation to the cam 58 disclosed in the patent referred to. Fixed on the shaft 72 and adjacent to the cam 69 is an arm 73 which is provided with a pin cooperating with the associated cam. When the rocking of the main shaft 17 rocks the shaft 72, the arm 73 oscillates cam 69, thereby causing it to tilt the zero shutters out of the path of the sectors 3 in the manner disclosed in Powers Patent No. 1,236,481.

Figure 6:
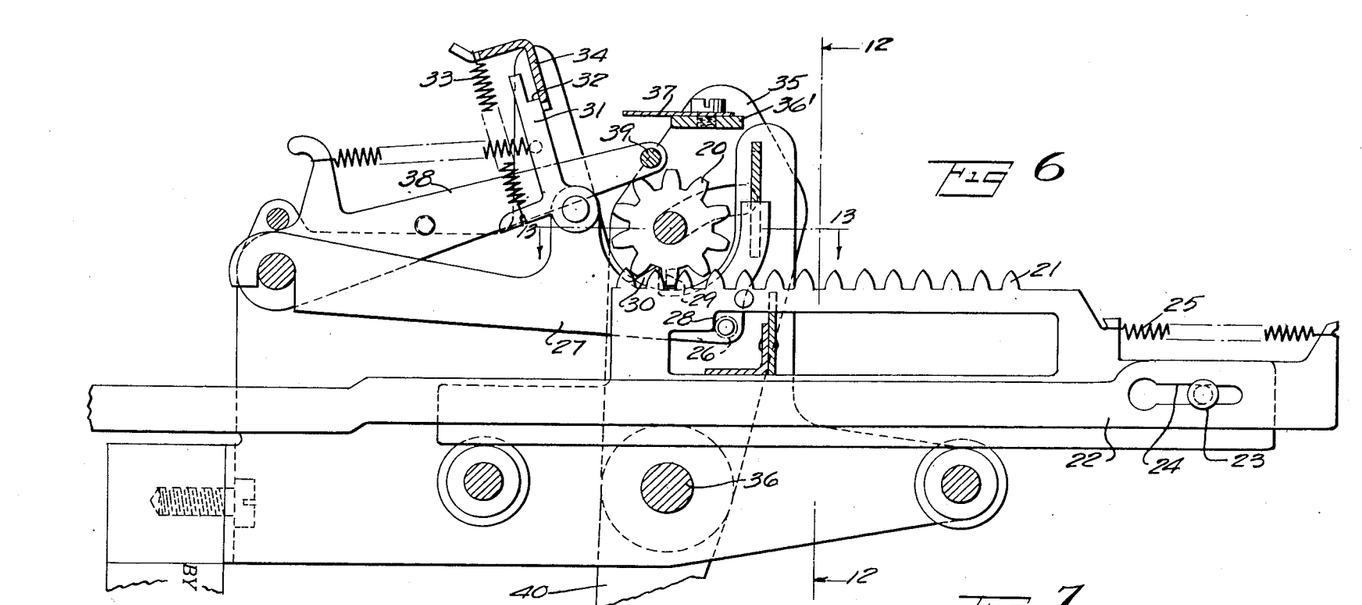
Fig. 6 is an enlarged sectional view of one of the accumulating mechanisms which I utilize.
Figure 7:
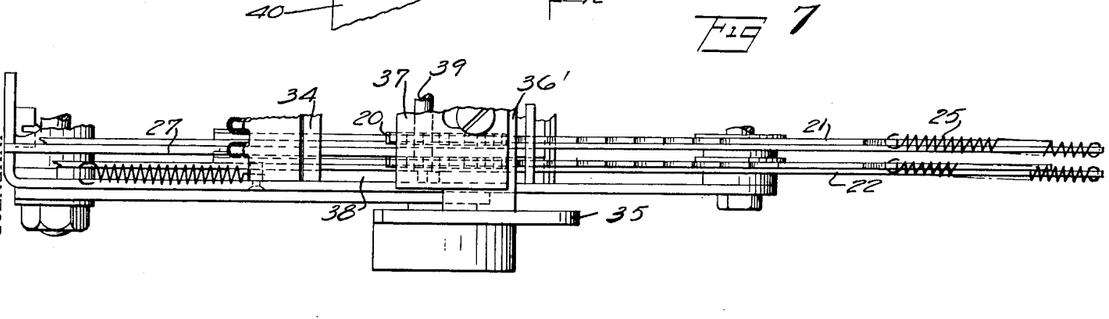
Fig. 7 is a plan view of the parts shown in Fig. 6.
Figure 8:
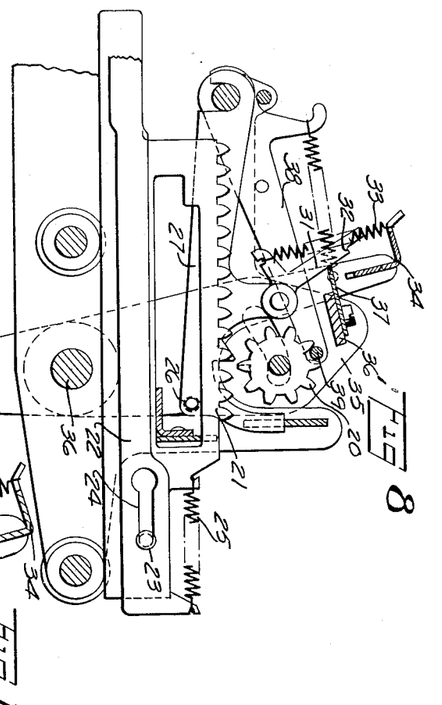
Fig. 8 is a view corresponding with Fig. 6 but showing the parts in a different position.

Referring to Figs. 1, 6 and 8, the accumulating wheels of the second set are designated by the numeral 20. Each accumulating wheel 20 is adapted to cooperate with a rack 21 connected with a bar 22, which in turn is connected to a type bar 2.

The movement of accumulating wheels 20 into and out of engagement with their racks 21 is controlled by a pair of cam levers 35 fixed to shaft 36. The accumulating wheels 20 are loosely mounted on a rod which has its opposite ends supported in a slot in each of the cam levers 35.

Fixed to shaft 36 is an arm 40 which in turn is connected with a bar 41. The latter connection is shown as formed by a pin and slot, with spring 42 holding the parts in normal position. This provides a yielding engagement to take up the strain in case an accumulating wheel 20 should get out of alignment with its rack 21.

The bar 41 is operated in substantially the same way as the bar 6 associated with the set of front accumulating wheels 4. A crank 43 (see Fig. 4) carries a pin 45 adapted to cooperate with a notch 49 in the bar 41 and a pin 44 adapted to cooperate with the free end of a latch 59 which is pivoted on the bar 41. The free end of the latch is spring tensioned downwardly by a spring 51 and a stop 50' is provided on the bar 41 to limit the movement of the latch in the direction in which it is urged by the spring. This spring also serves to hold the bar 41 in raised position. Both the crank 43 and an arm carrying a roller 46 are fixed to the same rod. The roller 46 cooperates with a cam sector 47 which is fixed to shaft 48 to which the cam sectors 12 are also fixed. Under normal tabulating conditions, the bar 41 is in its upper position and pin 45 cooperates with notch 49. Accordingly, on the forward stroke of cam sector 47, the bar 41 is moved rearwardly, thereby rocking arm 40 counter-clockwise and causing cam levers 35 to disengage the accumulating wheels 20 from the racks 21 during the forward stroke of the racks. On the rearward stroke of cam sector 47, the bar 41 is pulled forward, thereby engaging the accumulating wheels 20 with the racks 21 during the backward stroke of the racks. A pivoted lever 40a (see Fig. 1) which is spring biased downwardly, is provided on its lower edge with two notches which cooperate with a stud on arm 40 to hold the accumulating wheels 20 positively in or out of engagement with their racks 21 until their position with relation to the racks is changed by a movement of the bar 41. During normal tabulating operations, the accumulating wheels 20 are thus positively disengaged from the racks 21 during the forward stroke of the racks and positively engaged therewith during their backward stroke. When the accumulating wheels 20 are out of engagement with racks 21, they are held against improper movement by a rod 39 (see Figs. 1 and 8) which is supported by a pair of pivot arms 38. When the accumulating wheels are moved into engagement with the racks, they are moved out of engagement with the rod (as may be seen from Fig. 6) and they are thus free to rotate.

It has been pointed out in Powers Patent No. 1,245,502, at page 8, lines 16–19, inclusive, that at the end of each cycle, all of the type bars 2 are aligned with their "zero" types one tooth space anterior to printing position. On both its forward and back strokes, therefore, each type bar 2 moves a distance greater by one tooth space than the movement it is desired to transmit to the corresponding rack 21. To avoid transmitting this extra movement to the racks 21, each bar 22 is given a lost motion of one tooth space both before and after it moves the associated rack 21. The desired lost motion is provided in the following manner. Each rack is slidably connected to the corresponding bar 22 by means of a pin 23 on the rack which slides in a slot 24 provided in the bar and the rack is coupled to the bar by a spring 25 tensioned between arms on both members (see Figs. 1, 6 and 8).

The backward stroke of each rack 21 is normally limited by a pin 26 which is carried on an arm 27 and engages a shoulder 28 formed by a cutout in the rack. When the pin 26 strikes the shoulder 28 of a rack, the rack is arrested in its zero position with the pin 23 one tooth space anterior to the rear edge of the slot 24 in the associated bar 22. Let it be assumed that the racks 21 are in their zero positions before the type bars 2 take their forward stroke and that they are arrested in their zero position on their backward stroke. As the type bars 2 start their forward stroke, the racks 21 remain stationary until the type bars reach their zero position, as a lost motion of one full tooth space is provided by the movement of the pins 23 from their position one tooth space anterior to the rear edge of slots 24 into engagement with the rear edge of the slots. When the type bars 2 reach their zero position, the pins 23 have reached the rear end of slots 24, as shown in Fig. 8, and the subsequent movement of the type bars 2 is transmitted to the racks 21 until the racks reach their zero position on their backward stroke, at which time they are normally arrested by the pins 26. As the type bars 2 pass from their zero position to their extreme rearward position, the bars 22 take an additional step of one tooth space beyond the zero position of the racks, so that the pin 23 on each rack is one tooth space anterior to the rear end of slot 24 and the bars 22 are thus provided with a lost motion of one tooth space. It is evident from the foregoing description that the connection between the type bars 2 and racks 21 is such that only that part of the forward movement of the type bars 2 between their zero position and their ultimate forward position and only that part of the backward movement of the type bars between their ultimate forward position and their zero position are transmitted to the racks 21.

The "tens" carry from accumulating wheels 20 of lower orders to those of higher orders is effected independently of the "tens" carry from accumulating wheels 4 of lower orders to those of higher orders. The following mechanism is provided for effecting this carry. It is to be noted (see Fig. 13) that there is a rack 21 for each denominational order and that each rack has associated with it an arm 27. The pin 26 on any arm 27, however, does not control the movement of the rack 21 with which the arm 27 is associated, but controls instead the movement of the rack 21 of the next higher denominational order. For example, the movement of the rack associated with the accumulating wheel registering "tens" is controlled by the pin 26 carried on the arm 27 which lies under the accumulating wheel registering "units". During an accumulating operation, as previously stated, the accumulating wheels 20 engage the racks 21 during their backward stroke. Accordingly, when the accumulator registering "units" passes through its zero position during the backward stroke of the racks, the cam stop 29 (Figs. 9 and 11) presses against the cam stop 30 and depresses the arm 27 associated with the "units" rack. Pivoted to each arm 27 is a bell crank lever 31 having a shoulder 32. The vertical arm of each lever 31 is normally held against a stop 34, mounted on the frame, by a spring 33, which also serves to hold the associated arm 27 in raised position. The normal position of the bell-crank lever 31 is shown in Fig. 6. When arm 27 associated with the units rack is depressed by the action of cam stops 29 and 30, shoulder 32 on the lever 31 associated with the depressed arm 27 engages stop 34 and the arm 27 is held down, as may be seen from Fig. 10. When this occurs the backward movement of the rack 21 associated with the accumulating wheel registering "tens" is not limited by the engagement of pin 26 with shoulder 28, but the spring 25 moves the rack rearwardly until the pin 23 engages the rear end of slot 24. This extra movement of one tooth space thus effects a "tens" carry from the accumulating wheel 20 registering 'unit" to the accumulating wheel registering "tens". In a similar manner, a "tens" carry would be effected from any other accumulating wheel 20 to the accumulating wheel of the next higher denominational order.

Figure 9:
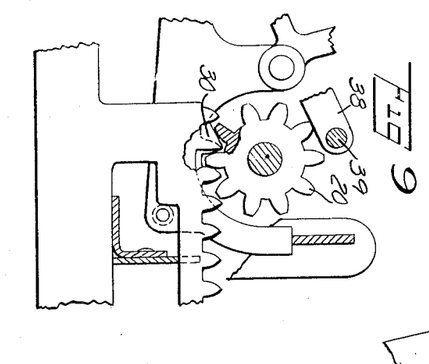
Figs. 9 and 10 are detailed views to illustrate the carrying or transfer mechanism.
Figure 10:
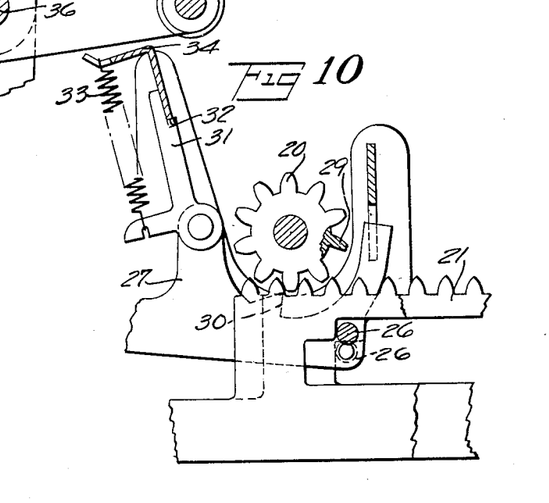
Figure 11:
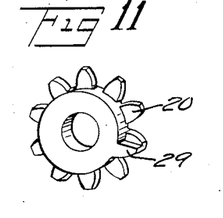
Fig. 11 is a perspective view of one of the accumulating wheels.
Figure 12:
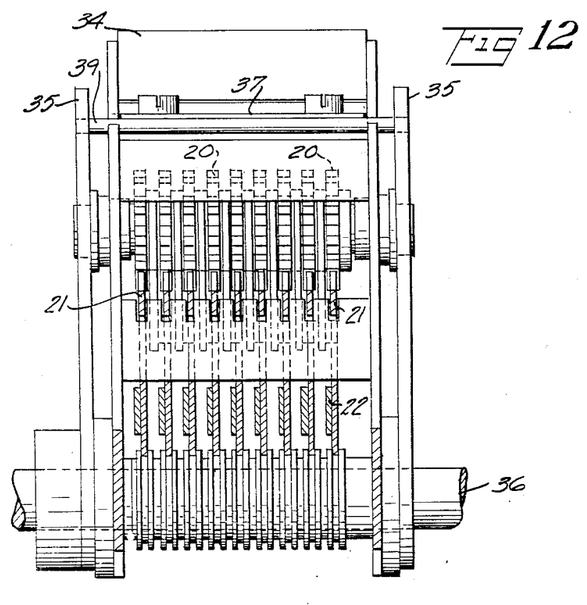
Fig. 12 is a section on line 12—12 of Fig. 6.

This operation is illustrated in Figs. 9 and 10. In Fig. 9, the accumulating wheel 20 (which may be the one to register "units") is shown in the "nine" position, and as the zero tooth is broken away, cam stop 29 is shown just engaging the cam surface of cam stop 30. Fig. 10 shows the position of the parts after the units accumulating wheel has been rotated 3 spaces on the next adding operation. Cam stop 29 has now passed out of engagement with cam stop 30 but arm 27 is held depressed, with the result that the rack 21 of the accumulating wheel 20 which registers "tens" has moved a full tooth space beyond normal thereby effecting a "tens" carry.

It is thus evident that the "tens" carry on the accumulating wheels 20 in any accumulating unit is effected independently of the "tens" carry on the accumulating wheels 4 in the same unit, and that the carry on the accumulating wheels 20 is effected at the end of the rearward stroke of the racks 21 much as the carry on the accumulating wheels 4 is effected at the end of the rearward stroke of the sectors 3.

It is necessary to provide means effective at the beginning of each item recording cycle to raise any arms 27 which have been lowered during a "tens" carrying operation in the preceding item recording cycle. As the cam levers 35 are actuated at the beginning of each item recording cycle to lift the accumulating wheels 20 out of mesh with the racks 21 before the racks begin their forward stroke, such means may be placed under control of the cam levers. Accordingly, between their upper ends, levers 35 carry a bar 36' to which is attached a plate 37. Whenever the accumulating wheels 20 are disengaged from the racks 21 at the beginning of an item recording cycle, the plate 37 strikes the levers 31 having their shoulders 32 latched by stops 34 and releases the corresponding arms 27 which have previously been depressed to effect a "tens" carrying operation. This operation is shown in Fig. 8.

In order to take a total from the rear accumulating wheels 20, a space card and a stop card are placed at the end of the group of cards which is to be tabulated just prior to the taking of a total from the wheels 20.

The reason for the use of a space card before a total card and before a stop card will now be explained. In the preceding description, it has been explained that the racks 21 of each denominational order are arranged to effect a "tens" carry to the accumulating wheels 20 of the next higher order, and that in effecting this carry, the racks 21 are moved beyond their zero position to a position one tooth space behind normal. At the same time, the sectors 3 to which a "tens" carry has been effected are one tooth position in the rear of normal. It is, therefore, necessary to align the sectors 3 in their zero or normal position before a total is taken from the front accumulating wheels 4, and to align the racks 31 at their zero position before a total is taken from the accumulating wheels 20. To effect this alignment a spacing cycle must be interpolated between the last item recording cycle and the total cycle. This spacing cycle is interpolated by inserting a spacing card after the last record card in any group of which a total is to be taken. As the bar 41 is left in its normal raised position during the spacing cycle, the cam levers 35 disengage the accumulating wheels 20 from the racks 21 during the first half of the spacing cycle, and the plate 37 releases any of the arms 27 which have been depressed during the last item recording cycle. At the end of the spacing cycle, therefore, the machine is conditioned to permit the proper total to be taken from either the front accumulating wheels 4 or the rear accumulating wheels 20.

As the only reason for using the space cards is to align the front and rear racks at their zero position prior to the total-taking cycle, it is evident that when successive totals are taken from the front accumulating wheels 4 and the rear accumulating wheels 20, a space card, a total card and a stop card may be placed in the order mentioned at the end of the group of cards which is to be tabulated just prior to the taking of a total from the two sets of wheels. In this case, the space card preceding the stop card may be omitted since the rear set of racks 21 is aligned at zero position by the space card preceding the total card.

After the space card preceding the stop card has aligned the front and rear sets of racks at their zero position, the space card is fed out of the sensing chamber and the stop card is fed into sensing position in the chamber. The stop card, as previously stated, is a blank card except for the special stop hole which cooperates with the total pin 89. When the pin box 83 is raised, the collar 92 of the total pin 89 passes through the special hole in the stop card, thereby rocking the bar 97 to bring the lug 109 below the lug 108. When the bell-crank lever 99 is rocked by the cam 104, the lug 109 does not strike the lug 108, and, accordingly, the main total shaft 17 of the present invention is not rocked, but instead the bar 97 is moved freely to the left. As the bar is connected to the pin 89 by a rod 96 extending through the pin, the bar 97 is reciprocated with respect to the total pin 89. When the bar 97 is thus positioned and moved toward the right, it aligns with rod 6m (see Fig. 9 of Powers Patent No. 1,245,502) and hence moves rod 6m, which causes the motor circuit of the tabulator to be opened and the machine stopped, as will be seen upon reference to page 4, lines 79–124, inclusive, of the patent. The machine is stopped by the stop card at a point in the machine cycle before the sector 47 begins its forward stroke.

Figures 2, 3:
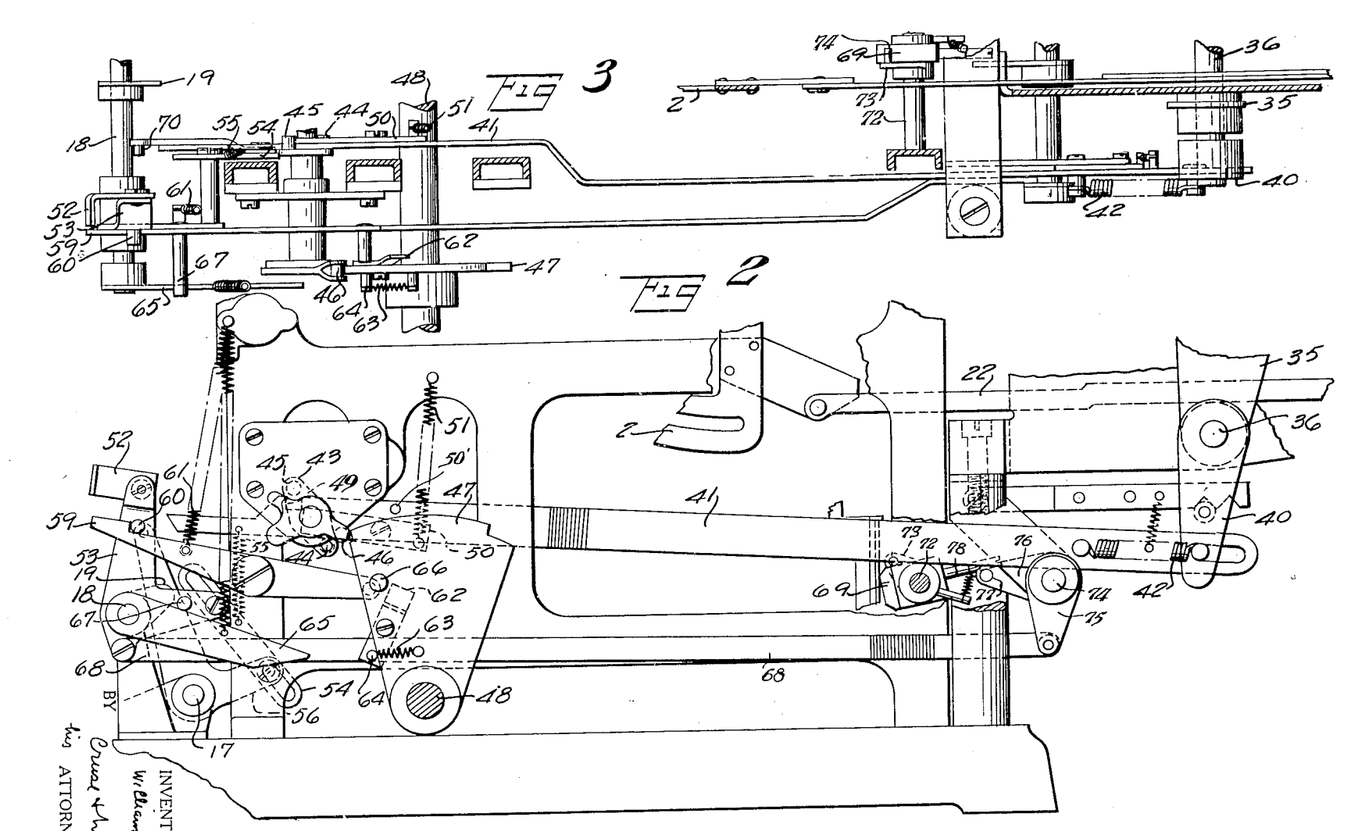
Fig. 2 is a detailed view of a portion of the control mechanism for the accumulating wheels.
Fig. 3 is a plan view of the parts shown in Fig. 2.

After the machine has been stopped, the operator actuates the handle 52 to condition the rear accumulating wheels 20 for total-taking. Fig. 2 shows the machine set to print a total accumulated on accumulating wheels 20, with the parts in the position they occupy before the forward stroke of the sector 47. The operation of the handle 52 rocks the vertical arm of a bell-crank lever 53 which is loosely mounted on an auxiliary total shaft 18. To hold the bell-crank lever in its rocked position there is provided a latch 59 which is adapted to engage a pin 60 on the lever 53 (see Fig. 2) and to be held in engagement with the pin by a spring 61 (see Figs. 2 and 4). The bar 41 is connected by a spring 55 to a bar 54 (see Figs. 2, 4 and 5) and this bar is connected by pin and slot connections to an arm on the lever 53 and to the horizontal arm of a bell-crank lever 56 which is fixed on the main total shaft 17. When the lever 53 is rocked, the bar 54 is depressed and the spring 55 is tensioned, thus moving bar 41 into its lower position against the action of spring 51. The pin and slot connection between the bar 54 and the arm of bell-crank lever 56 prevents the rocking of the main total shaft 17 by the depression of the bar 54. It may also be observed at this point that the pin and slot connection between the bar 54 and the lever 53 prevents the rocking of the latter when the main total shaft 17 is rocked. As long as the lever 53 is held rocked by the latch 59, the bar 41 will be retained in its lower position. After the machine has been stopped and card handle 52 operated, the operator actuates the start handle to restart the tabulator. This handle is shown as 6b in Fig. 3 of Powers Patent No. 1,245,502, and its function, as described in that patent, is to close the motor circuit to restart the machine. When the machine is started the stopped card is still in the sensing chamber of the machine, and as it is a blank card, except for the special stop hole, the sensing pins 85 are held depressed by the card and hence none of the stops 3a is raised. Accordingly, the racks 3 are free to move forward.

As the bar 41 is now in its lower position, the pin 45 cannot cooperate with the notch 49 and the pin 44 cannot cooperate with the latch 50 during the forward stroke of the cam sector 47. This is clearly shown in Fig. 2. As the bar 41 is in its extreme forward position at the beginning of the total cycle, the accumulating wheels 20 are in engagement with the racks 21, and as the forward stroke of the cam 47 does not affect the bar, the bar remains in its extreme forward position during the forward stroke of the cam sector 47 with the result that the accumulating wheels 20 are retained in engagement with the racks 21 during their forward stroke.

Figure 4:
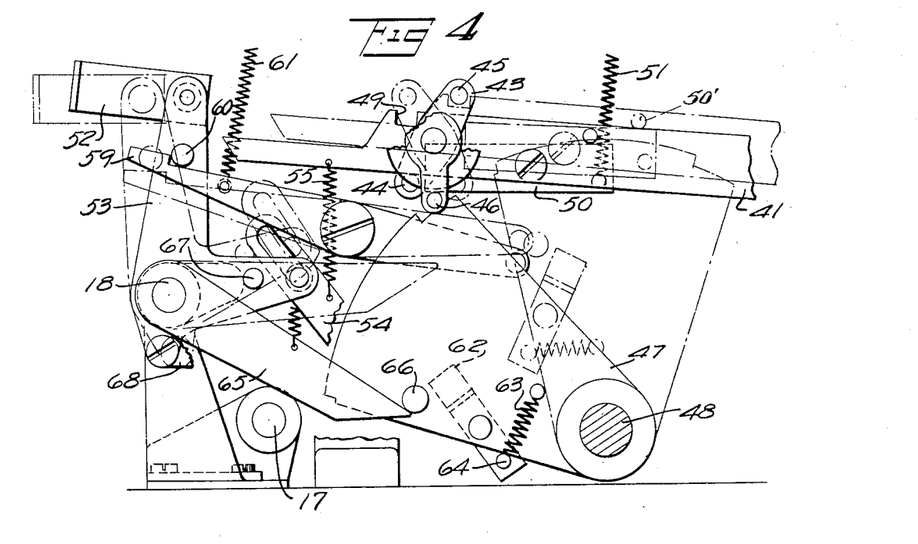
Figs. 4 and 5 are detailed views showing the movement of some of the parts during the operations.

As the racks 21 take their forward stroke, each accumulating wheel 20 revolves until its cam stop 29 strikes the corresponding cam stop 30 on arm 27, thereby arresting the forward movement of the associated rack and setting the associated type bar 2. The forward stroke of the racks 21 thus sets the type bars 2 in the position of the accumulated total and the accumulating wheels 20 are cleared. During the backward stroke of the racks, the accumulating wheels 20 are held out of engagement with their racks 21 by the cooperation between the pin 44 and the latch 50. This is effected in the following manner. At the end of the forward stroke of the cam sector 47, the pin 44 has been moved from its position beneath the latch 50, as shown in Fig. 2, into the position anterior to the front edge of the latch 50, as shown in Fig. 4. When the pin 44 reaches the position shown in Fig. 4, the spring 51 rocks the latch, thus preventing the pin 44 from returning to its neutral position at the end of the forward stroke of the cam sector. Just before the racks 21 begin their rearward movement, the pin 44 cooperates with the latch 50 to move the bar 41 to its extreme rearward position, thereby rocking the arm 40 in a counter-clockwise direction to disengage the accumulating wheels 20. The accumulating wheels 20 are, therefore, held out of engagement with the racks 21 during the backward stroke of the racks, and are thus retained in their cleared condition.

At the end of the total stroke, it is necessary to disengage the latch 59 from the pin 60 on lever 53 to permit the bar 41 to be returned to the normal raised position and thus recondition the rear accumulating wheels 20 for further accumulating operations. To this end, a block 62 is pivoted on cam sector 47 and is spring biased in a counter-clockwise direction. The movement of the block in a counter-clockwise direction is limited by a pin 64 on the block which engages the edge of cam sector 47, but the movement of the block in a clockwise direction is unlimited. As the block 62 is free to move in a clockwise direction against the tension of the spring 63, it merely moves over the rear end of the latch 59 during the forward stroke of cam sector 47, and does not affect the latch. But near the end of the back stroke of the cam sector 47, the block 62 engages the latch, and as its movement in a counter-clockwise direction is limited by the stop 64, it rocks the latch 59 against the action of spring 61. The latch thus releases, allowing the spring 51 to lift the bar 41 to its normal raised position and to restore the lever 53 to its unoperated position. As the bar is in its extreme rearward position, the pin 45 will not cooperate with the notch 49 on the first half cycle of the next accumulating cycle and the bar will be left in the position mentioned during that half cycle. The accumulating wheels 20 will thus remain disengaged from the racks 21 during this half cycle, as they normally are during the first half of an accumulating cycle. At the end of the first half cycle, however, the pin 45 will enter the notch 49, and the bar 41 will be conditioned to move the accumulating wheels 20 into engagement with the racks 21 during the second half cycle. It is, therefore evident that the raising of the bar 41 at the end of the total cycle conditions it to effect ordinary accumulating operations on the rear accumulating wheels 20.

As previously stated, the zero shutters must be tilted before the sectors 3 and racks 21 can be reciprocated during the total cycle, and for this purpose the zero shutters are also placed under control of the lever 53. When the lever 53 is rocked, a link 68 rocks a transverse shaft 74 in a clockwise direction through an arm 75 fixed on the shaft and connected to the link. Fixed to the shaft 74 is an arm 76 having a pin 77 which cooperates with a rod 78 connected to the cam 69 (see Figs. 1 and 2). Accordingly, when the shaft 74 is rocked, the arm 76 is raised to rotate the cam 69, which as previously stated, is loosely mounted on shaft 72. In this way, the zero shutters are tilted out of the path of the sectors 3 when a total is to be taken from accumulating wheels 20.

It is also necessary to provide means for preventing the accumulating wheels 4 from engaging their racks 3 during a total taking cycle in which a total is taken from the rear accumulating wheels 20. This is effected by an arm 65 which is fixed to the auxiliary total shaft 18. When the handle 52 is operated, a pin 67 on lever 53 rocks the arm 65 slightly to bring the outer end of the arm into the path of a pin 66 on the cam sector 47. It is to be noted that the pin 66 will not control arm 65 when the machine is set for ordinary tabulation. When the arm 65 is thus rocked, the auxiliary total shaft 18 is given a slight rotary movement to bring the arm 19 on the shaft 18 into engagement with the arm 16a fixed to the total shaft 17, as is shown in broken lines in Fig. 14. The main total shaft 17, therefore, remains unrocked during the greater part of the forward stroke of the cam sector 47, and, accordingly, the bar 6 is retained in its raised position with the pin 11 positioned in notch 8. At the beginning of the forward stroke of cam sector 12, the bar 6 is, therefore, moved to its extreme rearward position and the accumulating wheels 4 are disengaged from the sectors 3 for the duration of the forward stroke of the sectors in the same manner as in the first half of an ordinary accumulating cycle. At the end of the forward stroke of the cam sector 47, the pin 66 strikes the arm 65, rocking the auxiliary total shaft 18 and moving arm 19 and 16a into the position shown in full lines in Fig. 14 to rock the main total shaft 17. As previously explained, the rocking of arm 16a into this position moves the bar 6 into its lower position. But on the backward stroke of the cam sectors 12, the bar 6 is restored to its upper position by the restoration of the bar 65 to its normal position. At this time, however, the pin 11 is out of alignment with the notch 8 and does not cooperate with this notch and consequently bar 6 is retained in its extreme rearward position to which it was moved during the first half of the cycle. The accumulating wheels 4 in each unit are thus held out of engagement with the sectors 3 during both the forward and backward strokes of the sectors when a total is taken from the accumulating wheels 20. It is evident from the preceding description that the pin 11 will enter the notch 8 near the end of the first half of the next accumulating cycle, so that the raising of the bar 6 conditions it to effect further accumulation on the accumulating wheels 4.

Figure 5:
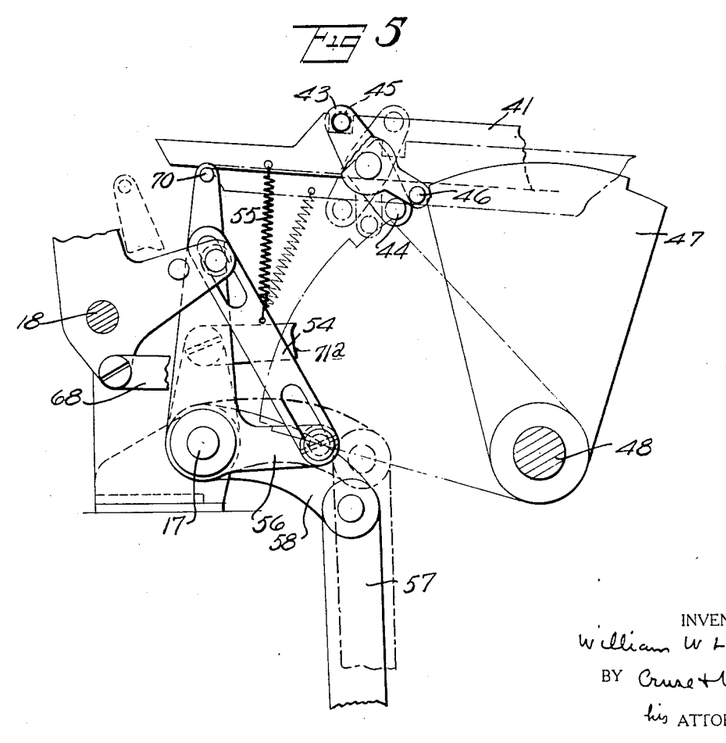

It is also necessary to provide means to prevent the taking of totals from the rear accumulating wheels 20 when a total is taken from the front accumulating wheels 4. This means consists of the bell-crank lever 56 which is fixed to the main total shaft 17 and is provided with a pin 70. In the normal position of the lever 56, the vertical arm of the lever is positioned in front of the bar 41, as is clearly shown in Fig. 1. But when the main total shaft 17 is rocked to initiate total taking from the accumulating wheels 4, the vertical arm of the lever 56 is moved in a clockwise direction and the pin 70 is positioned beneath the bar 41, as is shown in Fig. 5. The rocking of the total shaft 17 causes the horizontal arm of lever 56 to pull bar 54 downwardly, thereby tensioning spring 55, but the pin 70 prevents the bar from being moved into its lower position during the first half of the total taking cycle. During the first half of the total cycle, the bar 41 is thus retained in its raised position and is moved rearwardly by the pin 45 to disengage the accumulating wheels 20 from their racks 21 in the same manner as in the first half of an ordinary accumulating cycle. At the end of this half of the cycle, the bar is moved clear of the pin 70 and drops to its lower position. The free end of bar 41 is cut on a diagonal to provide a cam surface which acts in conjunction with the pin 70. If the bar 41 should get out of its proper alignment, this cam surface insures that the pin 70 is positioned beneath the bar 41 when the main total shaft 17 is rocked. It is to be observed that at the end of the first half of the total cycle, the pin 44 is positioned in front of the free edge of the latch 50 and at a distance from the free edge of the latch which is equal to the amount of rearward movement given to bar 41 by the upper pin 45 during the first half cycle. It is thus evident that the pin 44 does not engage the free edge of the latch 50 during the second half cycle and that the bar 41 is retained in its rearward position during this half cycle and holds the accumulating wheels 20 out of engagement with the racks 21 during the second half as well as during the first half of the total cycle. When total link 57 rocks back to its normal position, as shown in dotted lines in Fig. 5, the tension on spring 55 is released, and bar 41 moves to its raised position, ready to have notch 49 picked up by pin 45 during the next forward stroke of cam sector 47.

Fig. 1 shows the position of the parts under normal tabulating conditions just before the forward stroke of cam sector 12 and cam sector 47. Under these conditions, the bar 6 and the bar 41 are held in raised position. Accordingly, pin 11 remains in notch 8 in the bar 6 and pin 45 remains in notch 49 in the bar 41, with the result that the accumulating wheels 4 are held out of engagement with racks 3 and accumulating wheels 20 are held out of engagement with racks 21 on the forward stroke of type bars 2 and are brought into engagement with the racks on their return stroke.

Fig. 2 shows the machine set to print a total accumulated on the accumulating wheels 20 with the parts in the position they occupy before the forward stroke of the sector 47. Fig. 4 shows in full lines the position after the forward stroke, and shows in dot and dash lines the position after the return stroke. In Fig. 2, handle 52 has been pressed in so that latch 59 has engaged pin 60. Bar 54 has been forced down, increasing the tension of spring 55, thereby drawing bar 41 into its lower position, but it may be noted that pin 44 on lever 43 does not engage the free end of latch 50. Cam arm 65 has been partly depressed by the pin 67 on cam lever 53, bringing this arm into the path of pin 66. Shaft 18 has also been rocked slightly, bringing cam 19 (Fig. 14) into the position shown in dot and dash lines, and rod 68 has acted through the previously described cam mechanism to tilt the zero shutters from the path of sectors 3. As shaft 48 is rocked, swinging the cam sector 12 and the cam sector 47 forward, the cam sector 12 causes the accumulating wheels 4 to move out of engagement with sector 3, but, since pin 44 does not cooperate with latch 50 and pin 45 is disengaged from notch 49, cam sector 47 does not move bar 41 from its extreme forward position, and accumulating wheels 20 remain in engagement with racks 21. During the forward stroke of cam 12 and cam 47, therefore, the type bars 2 are moved to positions representing the total of the amounts accumulated on the accumulating wheels 20. As cam sector 47 continues its forward movement, block 62 snaps past the end of latch 59 without moving the latch, but pin 66 strikes arm 65, thereby further rocking shaft 18 and swinging cam 19 into the position shown in full lines in Fig. 14. This draws bar 6 down into the position shown in that figure, where neither notch 7 nor 8 in each bar engages its corresponding pin.

On the return stroke of the cam sector 12 and the cam sector 47, bar 6 is allowed to rise, but before notch 8 engages pin 11, the cam sector 12 swings this pin forward beyond the notch. During the return stroke of the cam sector 12, therefore, the pin 11 does not cooperate with the notch 8, and the bar 6 remains in its extreme rearward position to which it was moved during the first half of the cycle. Accordingly, the accumulating wheels 4 remain disengaged from the racks 3 during the return stroke, as well as during the forward stroke, of the type sectors 2. At the end of the total stroke, the bar 6 is raised and is in its extreme rearward position. On the next item recording cycle, the pin 11 will, therefore, engage the notch 8, thus conditioning the accumulating wheels 4 for further accumulation. The backward movement of cam sector 47 causes pin 44 on lever 43 to engage the free end of latch 50, thus moving the bar 41 to its extreme rearward position and lifting accumulating wheels 20 clear of racks 21. After this movement of bar 41 is completed, block 62 releases latch 59, and allows bell-crank lever 53 to return to normal position whereupon bar 41 moves to its raised position. Thus, at the end of the total stroke, the bar 41 is raised and in its extreme rearward position. On the next item recording cycle, the pin 45 will, therefore, engage notch 49, thus conditioning the accumulating wheels 20 for further accumulation.

Fig. 5 shows the operation of the parts when a total is being printed that has been accumulated by accumulating wheels 4. As previously described, such total is caused to be printed when shaft 17 is rocked into the position shown in full lines in Fig. 5 by the action of total link 57. During the first half of the total cycle, pin 70 mounted in the upper end of the vertical arm of lever 56 passes under the bar 41 and holds it up. Accordingly, as cam sector 47 makes its forward stroke, bar 41 is pushed back, lifting accumulating wheels 20 from racks 21. This movement is started by the action of pin 45 in notch 49, but as the movement goes on, bar 41 moves rearwardly so that its underside clears pin 70, permitting the bar to drop to its lower position. On the return stroke of cam sector 47, bar 41 is not moved from its extreme rearward position, and the accumulating wheels 20 remain out of engagement with the racks 21, but when total link 57 is released, and rocks back to its normal position as shown in dotted lines in Fig. 5, the tension on spring 55 is released, and bar 41 moves to its raised position, ready to have notch 49 picked up by pin 45 during the next forward stroke of cam sector 47.

Upon the rocking of main total shaft 17, arm 16 tensions spring 15, thus lowering bar 6, and rod 71a is actuated to remove the zero shutters in each of the accumulating units, thereby conditioning the accumulating wheels 4 to have a total extracted from them on the forward stroke of cam sectors 12.

It is evident from the foregoing description that the present invention provides means whereby a total can be taken from a set of front accumulating wheels in response to the automatic initiation of a total cycle and can be taken from a rear set of accumulating wheels in response to a manual operation under control of the operator.

What I claim is:

1. In a tabulator, the combination of first and second totalizers, a set of record card controlled racks for each totalizer, each set of racks being engageable by the corresponding totalizer, separate totalizer rocking mechanisms for engaging and disengaging the totalizers and the sets of racks, each of said mechanisms including a member for controlling the operation thereof, means normally causing each control member to condition the totalizer rocking mechanism controlled thereby to effect accumulating engagement between the corresponding totalizer and the set of racks engageable thereby, a mechanism adapted when held set during a cycle to cause the control members to so vary the operation of the totalizer rocking mechanisms that total-taking engagement between the first totalizer and the corresponding set of racks is effected and total-taking or accumulating engagement between the second totalizer and the corresponding set of racks is prevented, and record card controlled means for setting said settable mechanism and for holding it set for the duration of a cycle.

2. In a tabulator, the combination of first and second totalizers, a set of record card controlled racks for each totalizer, each set of racks being engageable by the corresponding totalizer, separate totalizer rocking mechanisms for engaging and disengaging the totalizers and the sets of racks, each of said mechanisms including a member for controlling the operation thereof, means normally causing each control member to condition the totalizer rocking mechanism controlled thereby to effect accumulating engagement between the corresponding totalizer and the set of racks engageable thereby, a mechanism adapted when held set to cause the control members to so vary the operation of the totalizer rocking mechanisms that total-taking engagement between the first totalizer and the corresponding set of racks is effected and total-taking or accumulating engagement between the second totalizer and the corresponding set of racks is prevented, record card controlled means for setting said mechanism, anchoring means for holding said mechanism in set position, and means for causing said anchoring means to release said mechanism.

3. In a tabulator, the combination of first and second totalizers, a set of record card controlled racks for each totalizer, each set of racks being engageable by the corresponding totalizer, separate totalizer rocking mechanisms for engaging and disengaging the totalizers and the set of racks, each of said mechanisms including a member for controlling the operation thereof, biasing springs each normally retaining one of the control members in a position to cause the totalizer rocking mechanism controlled thereby to effect accumulating engagement between the corresponding totalizer and the set of racks engageable thereby, a mechanism adapted when held set to cause the control members to so vary the operation of the totalizer rocking mechanisms that total-taking engagement between the first totalizer and the corresponding set of racks is effected and total-taking or accumulating engagement between the second totalizer and the corresponding set of racks is prevented, record card controlled means for setting said mechanism, anchoring means for holding said mechanism in set position, and means for causing said anchoring means to release said mechanism to permit it to be returned by said biasing springs into normal position.

4. In a tabulator, the combination of first and second totalizers, a set of record card controlled racks for each totalizer, each set of racks being engageable by the corresponding totalizer, separate totalizer rocking mechanisms for engaging and disengaging the totalizers and the sets of racks, each of said mechanisms including a member for controlling the operation thereof, means normally causing each control member to condition the totalizer rocking mechanism controlled thereby to effect accumulating engagement between the corresponding totalizer and the set of racks engageable thereby, a total shaft, record card controlled means for rocking said shaft and for holding it rocked for the duration of a machine cycle, and means controlled by said total shaft and rendered effective when the shaft is held rocked to cause the control members to so vary the operation of the totalizer rocking mechanisms that total-taking engagement between the first totalizer and the corresponding set of racks is effected and total-taking or accumulating engagement between the second totalizer and the corresponding set of racks is prevented.

5. In a tabulator, the combination of first and second totalizers, a set of record card controlled racks for each totalizer, each set of racks being engageable by the corresponding totalizer, separate totalizer rocking mechanisms for engaging and disengaging the totalizers and the sets of racks, each of said mechanisms including a control member for controlling the operation thereof, biasing springs each normally retaining one of the control members in a position to cause the totalizer rocking mechanism controlled thereby to effect accumulating engagement between the corresponding totalizer and the set of racks engageable thereby, a total shaft, a mechanism controlled by the total shaft and rendered effective when said shaft is held rocked to cause the control members to so vary the operation of the totalizer rocking mechanisms that total-taking engagement between the first totalizer and the corresponding set of racks is effected and total-taking or accumulating engagement between the second totalizer and the corresponding set of racks is prevented, record card controlled means for rocking said total shaft, anchoring means for holding said total shaft in rocked position, and means for releasing said anchoring means to permit said biasing springs to return said shaft to unrocked position.

6. In a tabulator, the combination of first and second totalizers, a set of record card controlled racks for each totalizer, each set of racks being engageable by the corresponding totalizer, a cyclically oscillatable shaft, a pair of cams carried by said shaft, separate mechanisms each actuated by one of said cams for engaging and disengaging the totalizers and the sets of racks, each cam actuated mechanism including a member for controlling the operation thereof, means normally causing each control member to condition the cam actuated mechanism controlled thereby to effect accumulating engagement between the corresponding totalizer and the set of racks engageable thereby, a mechanism adapted when held set during a cycle to cause the control members to so vary the operation of the cam actuated mechanisms that total-taking engagement between the first totalizer and the corresponding set of racks is effected and total-taking or accumulating engagement between the second totalizer and the corresponding set of racks is prevented, and record card controlled means for setting said settable mechanism and for holding it set for the duration of a cycle.

7. In a taubular, the combination of first and second totalizers, a set of record card controlled racks for each totalizer, each set of racks being engageable by the corresponding totalizer, a cyclically oscillatable shaft, a pair of cams carried by said shaft, separate mechanisms each actuated by one of said cams for engaging and disengaging the totalizers and the sets of racks, each cam actuated mechanism including a member for controlling the operation thereof, biasing springs each normally retaining one of the control members in a position to effect accumulating engagement between the corresponding totalizer and the set of racks engageable thereby, a total shaft, record card controlled means for rocking said shaft, anchoring means for holding said shaft rocked, means controlled by said total shaft and rendered effective when said shaft is held rocked to cause the control members to so vary the operation of the cam actuated means that total-taking engagement between the first totalizer and the corresponding set of racks is effected and total-taking or accumulating engagement between the second totalizer and the corresponding set of racks is prevented, and means for causing said anchoring means to release said total shaft to permit said control members and total shaft to be returned to unrocked position by said biasing springs.

8. In a tabulator, the combination of first and second totalizers, a set of record card controlled racks for each totalizer, each set of racks being engageable by the corresponding totalizer, separate totalizer rocking mechanisms for engaging and disengaging the totalizers and the sets of racks, each of said mechanisms including a member for controlling the operation thereof, means normally causing each control member to condition the totalizer rocking mechanism controlled thereby to effect accumulating engagement between the corresponding totalizer and the set of racks engageable thereby, a mechanism adapted when manually set to cause the control members to condition the totalizer rocking mechanisms to effect total-taking engagement between the second totalizer and its set of racks and to prevent total-taking or accumulating engagement between the first totalizer and its set of racks, an anchoring means for holding said mechanism in set position, record card controlled means for stopping said machine to permit setting of said mechanism, means for restarting said machine to permit operation of the totalizer rocking mechanisms under control of said manually settable mechanism, and means for causing the anchoring means to release said mechanism at the end of the cycle following the setting of the manually settable mechanism.

WILLIAM W. LASKER.